(12) United States Patent
    Bitauld

(10) Patent No.: US 10,805,074 B2
(45) Date of Patent:     Oct. 13, 2020

(54) FIBRE-OPTIC COMMUNICATION BASED ON ENCODED FREQUENCY-SHIFTED LIGHT

(71) Applicant: Nokia Technologies Oy, Espoo (FI)

(72) Inventor: David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 306 days.

(21) Appl. No.: 15/580,891

(22) PCT Filed: Jun. 11, 2015

(86) PCT No.: PCT/FI2015/050413
    § 371 (c)(1),
    (2) Date: Dec. 8, 2017

(87) PCT Pub. No.: WO2016/198728
    PCT Pub. Date: Dec. 15, 2016

(65) Prior Publication Data
    US 2018/0167209 A1     Jun. 14, 2018

(51) Int. Cl.
    *H04L 9/08*         (2006.01)
    *H04B 10/70*        (2013.01)
    *H04B 10/2587*      (2013.01)
    *H04B 10/516*       (2013.01)
    (Continued)

(52) U.S. Cl.
    CPC ....... *H04L 9/0852* (2013.01); *H04B 10/2587* (2013.01); *H04B 10/516* (2013.01); *H04B 10/70* (2013.01); *H04B 10/85* (2013.01); *H04B 10/25* (2013.01)

(58) Field of Classification Search
    CPC ..... H04L 9/0852; H04L 9/0858; H04B 10/25; H04B 10/2537; H04B 10/2587; H04B 10/516; H04B 10/532; H04B 10/548; H04B 10/70; H04B 10/85
    See application file for complete search history.

(56) References Cited

U.S. PATENT DOCUMENTS

| | | | |
|---|---|---|---|
| 4,823,166 A * | 4/1989 | Hartog | G01D 5/268 250/227.19 |
| 4,879,763 A | 11/1989 | Wood | |
| 7,227,955 B2 | 6/2007 | Trifonov et al. | |

(Continued)

FOREIGN PATENT DOCUMENTS

| CN | 1989447 A | 6/2007 |
|---|---|---|
| CN | 102970099 A | 3/2013 |

(Continued)

OTHER PUBLICATIONS

Agrawal, Nonlinear Fiber Optics, Elsevier, 5th Edition, 2013, pp. 353-396.*

(Continued)

*Primary Examiner* — Minh Dinh
(74) *Attorney, Agent, or Firm* — Laine IP Oy

(57) ABSTRACT

According to an example aspect, there is provided an apparatus comprising a fibre interface coupled, via a first waveguide, with at least one encoder, a controller configured to cause the at least one encoder to encode light received in the apparatus via the fibre interface with information, and to cause a frequency shift in the light, and wherein the apparatus is configured to cause the light to propagate back to the fibre interface.

6 Claims, 8 Drawing Sheets

810 — Providing light from a light source to a fibre via a fibre interface, the light having a first frequency 820 — Producing filtered light from light received from the fibre interface, to suppress light having the first frequency 830 — Measuring, in a detector, at least one quantity of the filtered light

(51) Int. Cl.
*H04B 10/85* (2013.01)
*H04B 10/25* (2013.01)

(56) References Cited

U.S. PATENT DOCUMENTS

| | | | |
|---|---|---|---|
| 7,627,126 B1* | 12/2009 | Pikalo | H04L 9/0858 356/473 |
| 2006/0262930 A1 | 11/2006 | Dinu et al. | |
| 2007/0036553 A1 | 2/2007 | Etemad et al. | |
| 2007/0127932 A1 | 6/2007 | Qi et al. | |
| 2008/0037998 A1 | 2/2008 | Zhengfu et al. | |
| 2008/0260393 A1* | 10/2008 | Youn | H04L 9/0858 398/152 |
| 2012/0230702 A1 | 9/2012 | Yuan et al. | |
| 2015/0372768 A1* | 12/2015 | Dynes | H04B 10/70 398/188 |
| 2016/0218867 A1* | 7/2016 | Nordholt | H04L 9/0852 |

FOREIGN PATENT DOCUMENTS

| | | |
|---|---|---|
| EP | 0615358 A1 | 9/1994 |
| EP | 0717516 A1 | 6/1996 |
| WO | 2007066978 | 6/2007 |
| WO | 2013/135932 A1 | 9/2013 |
| WO | 2014060793 | 4/2014 |
| WO | 2014177197 | 11/2014 |
| WO | 2016/170223 A1 | 10/2016 |

OTHER PUBLICATIONS

Eraerds et al., Quantum key distribution and 1 Gbps data encryption over a single fibre, 2010.*
Kieu et al., Nonlinear stimulated Brillouin scattering in a single-mode optical fiber, 2013.*
Zou et al., Brillouin Scattering in Optical Fibers and Its Application to Distributed Sensors, IntechOpen, Feb. 2015.*
International Search Report received for corresponding Patent Cooperation Treaty Application No. PCT/FI2015/050413, dated Dec. 8, 2017, 13 pages.
Qi et al., "Quantum Key Distribution Based on a Sagnac Loop Interferometer and Polarization-insensitive Phase Modulators", IEEE International Symposium on Information Theory, Jul. 9-14, 2006, 4 pages.
Extended European Search Report received for corresponding European Patent Application No. 15894851.3, dated Jan. 31, 2019, 9 pages.
Office action received for corresponding Chinese Patent Application No. 201580082356.7, dated Nov. 4, 2019, 17 pages of office action and 2 pages of translation available.

\* cited by examiner

FIBRE-OPTIC COMMUNICATION BASED ON ENCODED FREQUENCY-SHIFTED LIGHT

RELATED APPLICATION

This application was originally filed as PCT Application No. PCT/FI2015/050413 filed Jun. 11, 2015

FIELD

The present invention relates to optical communication, such as for example to optical quantum key distribution.

BACKGROUND

Information may be secured in a number of ways. Information that is confidential in nature may comprise financial, medical, corporate, political or personal information, for example.

Confidential information may be stored in secure premises, preventing accidental or malicious access to the information by placing it in a locked place, such as for example in a safe in an office. Corporate locations may be further, or alternatively, provided with alarm systems, guards, fences and/or other access control functions.

Confidential information may be stored in computers that are not connected to any unsecure networks, to prevent unauthorized network intrusion therein to obtain the information. Such computers may be referred to as "air walled" computers as they have no connection to unsecure networks.

One way to prevent unauthorized access to confidential information is encryption, wherein a plaintext, for example a text in a natural language, such as French, is converted to a ciphertext using an encryption algorithm and a key. Encryption algorithms are designed to render it very difficult to obtain the plaintext from the ciphertext without the key. In general, ciphertext may be known as encrypted information.

In quantum key distribution (QKD), two parties may exchange quantum states and extract a secret key only known by them. The quantum states may be qubits, which are composed of the superposition of two orthogonal states such as orthogonal polarization states of a photon, such as 0° and 90°. Diagonal, 45°, anti-diagonal, −45°, or circular basis states such as left-handedness and right-handedness are possible superpositions of the 0° and 90° polarization states. The secret keys may subsequently be used for encryption and decryption of messages. A third party can, in theory, eavesdrop on the quantum state transmission between the two parties. Such eavesdropping perturbs the quantum state, however, introducing anomalies that the two intended parties can detect. The two parties may post-process the results of the quantum state measurements to remove any partial information acquired by an eavesdropper, and form shared secret keys.

An eavesdropper intercepting and re-transmitting a photon comprised in a quantum communication can only guess the original sending basis when it re-encodes and re-transmits the photon toward its original destination. The receiver may detect the eavesdropping since for subsets of bit values for which sending basis and measuring basis are found to match, parity values should match exactly, assuming the communication system is well tuned and free from imperfections in transmission and reception. Discrepancies in bit values introduced by eavesdropping enable the transmitter and receiver to detect eavesdropping and correct the secret keys.

Optical communication may be used in a classical mode as well, where an intensity of light encoded with information may be higher than in quantum communication.

SUMMARY OF THE INVENTION

The invention is defined by the features of the independent claims. Some specific embodiments are defined in the dependent claims.

In accordance with a first aspect of the present invention, there is provided an apparatus comprising a fibre interface coupled, via a first waveguide, with at least one encoder, a controller configured to cause the at least one encoder to encode light received in the apparatus via the fibre interface with information, and to cause a frequency shift in the light, and wherein the apparatus is configured to cause the light to propagate back to the fibre interface.

Various embodiments of the first aspect may comprise at least one feature from the following bulleted list:
- the fibre interface is coupled, by the first waveguide, to an optical attenuator and wherein the optical attenuator is coupled, via a second waveguide, with the at least one encoder
- the at least one encoder comprises exactly one phase shifter, and the controller is configured to control the exactly one phase shifter to encode the light and to cause the frequency shift in the light
- the at least one encoder comprises a first phase shifter and a second phase shifter, and wherein the controller is configured to cause the first phase shifter to encode the light and to cause the second phase shifter to cause the frequency shift in the light
- the controller is configured to provide a saw-tooth shaped electrical signal to cause the frequency shift in the light
- the controller is configured to provide a sinusoidal shaped electrical signal to cause the frequency shift in the light
- the controller is configured to cause alternating frequency shifts in the light, the alternating frequency shifts alternating between increasing the frequency of the light and decreasing the frequency of the light
- the frequency shift is at least 1 gigahertz and at most 10 gigahertz in absolute value
- the at least one encoder comprises a dual rail encoder
- causing the at least one encoder to cause a frequency shift in the light comprises
- causing at least one of the at least one encoder to add a progressive phase shift to the light.

In accordance with a second aspect of the present invention, there is provided an apparatus comprising a fibre interface coupled to a light source, the light source being configured to provide light to a fibre via the fibre interface, the light having a first frequency, a frequency selective optical filter optically coupled to the fibre interface, arranged, in producing filtered light, to suppress light having the first frequency, and a detector optically coupled to the optical filter, arranged to measure at least one quantity of the filtered light.

Various embodiments of the second aspect may comprise at least one feature from the following bulleted list:
- the optical filter is further arranged, in producing the filtered light, to suppress light at a frequency of Brillouin scattering of light at the first frequency
- a coupler or circulator couples the light source to the fibre interface, and the fibre interface to the optical filter the detector comprises a dual rail detector the optical filter is arranged to admit light which deviates from the first frequency by a frequency offset having an absolute value of at least 1 gigahertz and at most 10 gigahertz the light source comprises a laser.

In accordance with a third aspect of the present invention, there is provided a method comprising receiving, via a fibre interface, light and providing the light to at least one encoder, causing the at least one encoder to encode the received light with information, and to cause a frequency shift in the light, and causing the encoded and frequency shifted light to propagate back to the fibre interface.

Various embodiments of the third aspect may comprise at least one feature corresponding to a feature from the preceding bulleted list laid out in connection with the first aspect.

In accordance with a fourth aspect of the present invention, there is provided a method, comprising providing light from a light source to a fibre via a fibre interface, the light having a first frequency, producing filtered light from light received from the fibre interface, to suppress light having the first frequency, and measuring, in a detector, at least one quantity of the filtered light.

Various embodiments of the fourth aspect may comprise at least one feature corresponding to a feature from the preceding bulleted list laid out in connection with the second aspect.

In accordance with a fifth aspect of the present invention, there is provided an apparatus comprising means for receiving, via a fibre interface, light and providing the light to at least one encoder, means for causing the at least one encoder to encode the received light with information, and to cause a frequency shift in the light, and means for causing the encoded and frequency shifted light to propagate back to the fibre interface.

In accordance with a sixth aspect of the present invention, there is provided an apparatus comprising means for providing light from a light source to a fibre via a fibre interface, the light having a first frequency, means for producing filtered light from light received from the fibre interface, to suppress light having the first frequency, and means for measuring, in a detector, at least one quantity of the filtered light.

In accordance with a seventh aspect of the present invention, there is provided a non-transitory computer readable medium having stored thereon a set of computer readable instructions that, when executed by at least one processor, cause an apparatus to at least receive, via a fibre interface, light and providing the light to at least one encoder, cause the at least one encoder to encode the received light with information, and to cause a frequency shift in the light, and cause the encoded and frequency shifted light to propagate back to the fibre interface.

In accordance with a eighth aspect of the present invention, there is provided a non-transitory computer readable medium having stored thereon a set of computer readable instructions that, when executed by at least one processor, cause an apparatus to at least provide light from a light source to a fibre via a fibre interface, the light having a first frequency, produce filtered light from light received from the fibre interface, to suppress light having the first frequency, and measure, in a detector, at least one quantity of the filtered light.

In accordance with a ninth aspect of the present invention, there is provided a computer program configured to cause a method in accordance with at least one of the second and third aspects to be performed.

EMBODIMENTS

In an optical communication system where the encoder, or transmitter, has no light source and is arranged to encode light provided via a fibre from a receiver, the receiver may receive, in addition to encoded light from the encoder, also spuriously reflected and spuriously scattered light. The reflected and scattered light, or spurious light, may be caused by imperfections in the fibre, such that the imperfections interact with the light the receiver provides to the encoder for encoding, for example. To enable the receiver to suppress the spurious backscatter and reflections by spectrally discriminating filtering, the encoder may be arranged to frequency-shift the encoded light, to thereby cause a frequency offset between encoded and spurious light received in the receiver.

Figure 1A:
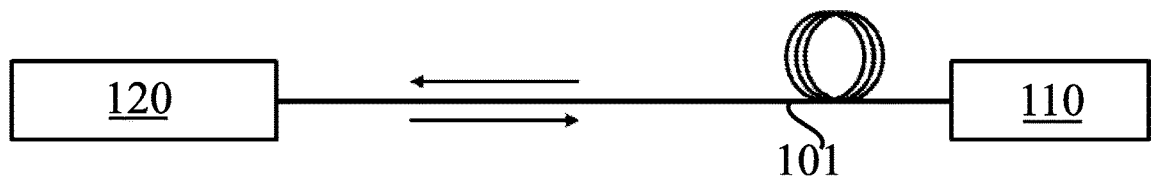
FIG. 1A illustrates a system in accordance with at least some embodiments of the present invention.

FIG. 1A illustrates a system in accordance with at least some embodiments of the present invention. The system of FIG. 1A comprises an emitter 120, as well as a receiver 110, a fibre 101 arranged between emitter 120 and receiver 110. Receiver 110 may comprise a fibre interface enabling receiver 110 to be coupled with fibre 101. Emitter 120 may comprise a fibre interface enabling emitter 120 to be coupled with fibre 101.

Fibre 101 may comprise, for example, a single mode, SM, fibre that does not preserve polarization of light traversing it. Fibre 101 may comprise an optical fibre. Fibre 101 may exhibit birefringence, wherein imperfections in the fibre, stress and/or bending of the fibre may cause polarization of photons passing through the fibre to rotate. Fibre 101 may cause light emitted from receiver 110 toward emitter 120 to spuriously scatter back toward receiver 110, and/or fibre 101 may cause light emitted from receiver 110 toward emitter 120 to spuriously be reflected, partly, back toward receiver 110. Such spurious properties may arise from imperfections in fibre 101, for example. The core of fibre 101 may comprise glass or transparent plastic, surrounded by a layer of material with a lower index of refraction, such as a different glass or plastic, for example. Fibre 101 may also cause, at least in part, attenuation of light passing through it and/or depolarization of light passing through it. In at least some embodiments, fibre 101 comprises a single fibre.

Receiver 110 may comprise or be otherwise coupled with a light source, such as, for example, a laser light source. A laser light source may comprise a continuous-wave or modulated laser light source, for example. To receive information from emitter 120, receiver 110 may be configured to provide light from the light source, via fibre 101, to emitter 120. In emitter 120, light received from receiver 110 via fibre 101 may be encoded with information and guided back to fibre 101, which will then convey the light back to receiver 110, where the information encoded into the light can be recovered. Information encoded into the light, that is, information that it is desired to communicate from emitter 120 to receiver 110, may be referred to as payload information.

In receiver 110, spurious light arrives from fibre 101 in addition to encoded light, such that the spurious light may make recovering the payload information from the encoded light more difficult. To enable receiver 110 to discriminate between spurious and encoded light, encoder 120 may be configured to frequency shift the encoded light with respect to the light incoming in encoder 120 from receiver 110. In emitter 120, the light may be first encoded and then frequency shifted, or first frequency shifted and then encoded, or the frequency shifting and encoding may take place at the same time, depending on the embodiment. As the spurious light may primarily be at, or around, the same frequency as the light emitted from receiver 110, receiver 110 can employ a spectrally discriminating filter arrangement to suppress the spurious light. Suppressing may comprise attenuating, for example, by 30, 60 or 90 decibels. Suppressing need not comprise completely suppressing. At an output of such a filter arrangement, the ratio of encoded to spurious light will be enhanced with respect to this ratio in light incoming in receiver 110. In effect, a signal to noise ratio will be enhanced by the spectrally discriminating filtering.

Spectral filtering may be especially advantageous in embodiments where encoded light is attenuated, for example toward a single-photon regime, in emitter 120. The spurious light may have an intensity that is proportional to the intensity of light provided from receiver 110 toward emitter 120, that is, the un-attenuated light. As the un-attenuated light has a higher intensity than the attenuated light, the spurious light may have a high intensity with regard to the encoded light, in other words, without spectral filtering the signal to noise ratio at receiver 110 may be low. Spectral filtering may also enable removal of a storage line in emitter 120, where light is guided to allow for spurious light to clear fibre 101 before encoded light from emitter 120 arrives in receiver 110. Such a storage line may need to be as long as half of the length of fibre 101.

In embodiments that comprise classical fibre communication, rather than quantum communication, attenuation in emitter 120 may be absent. While the gain in signal to noise ratio may be lower in classical communication than in quantum communication, the gain will nonetheless be real and it may enable communicating between emitter 120 and receiver 110 using less energy than without the frequency shifting and filtering, for example.

The encoding in encoder 120 may take place in polarization encoded form or dual rail form, for example. Light may be converted to dual rail form from polarization encoded form, for example, by splitting it to two orthogonal polarization components which are conveyed into two waveguides, one component into each waveguide. The light in one or two of the resulting components may be rotated so that the two rails have the same polarization. A waveguide may comprise a fibre or other structure that guides waves, for example electromagnetic waves such as light.

Dual rail encoding may be implemented on two waveguides, which may be parallel. Information may be encoded on the relative phase and amplitudes of the light in the two waveguides. Operations on the relative phase and amplitudes can be performed by at least one phase shifter on at least one of the two waveguides and/or by optical couplers between the two waveguides. In general, dual-rail encoding may comprise modifying at least one of amplitude and phase of the light in at least one of the two waveguides, such that a difference in delay between light in the two waveguides is much less than time used to communicate a bit.

Receiver 110 may be configured to measure polarization of light incoming into receiver 110 from emitter 120. Such measuring may occur in fixed polarization bases, for example, using a suitable detector. In order to successfully measure the polarization encoded light in receiver 110, polarization rotation incurred in fibre 101 may be compensated for. In some embodiments, receiver 110 is configured to convert polarization encoded light arriving from emitter 120, via fibre 101, into dual rail encoded form. A detector may take any of a number of suitable forms, depending on the embodiment of the invention. The detector may comprise interferometers and/or a plurality of single-photon detectors, for example.

Compensating for polarization rotation in fibre 101 may be performed in emitter 120, receiver 110 or partly in emitter 120 and partly in receiver 110. In some embodiments, compensating for polarization rotation in fibre 101 is not done. Where the compensating is performed in emitter 120, it may be done in a dual rail encoder of emitter 120 at the same time as the light is encoded with the information that is to be transmitted to receiver 110, for example.

The payload information the light is encoded with in emitter 120 may comprise, for example, at least one encryption key which can be communicated to receiver 120 over fibre 101 in a low-intensity regime. The encryption key may comprise a random bit sequence, for example.

At least one encoder may be controlled by a controller, which may comprise, for example, a microcontroller, processor, digital signal processor, application specific integrated circuit, ASIC, programmable controller or other electronic component arranged to control, at least in part, at least one of the at least one encoder. A controller may comprise more than one electronic component, for example, where encoder 120 comprises more than one encoder, each encoder may have an electronic component arranged to control it, such that the electronic components collectively form the controller. A controller may be configured to cause the at least one encoder to encode the light and to impart a frequency shift. A controller may be configured to cause the at least one encoder to encode and/or impart the frequency shift by causing an electrical signal to be provided to the at least one encoder. An electrical signal causing a frequency shift may comprise a saw-tooth shaped electrical signal or a sinusoidal electrical signal, for example, to cause a phase shifter to impart a progressive phase shift to the light. A progressive phase shift may be imparted over a pulse of light, for example, to thereby modify a frequency of light comprised in the pulse. The controller may be so configured by arranging the controller to execute a computer program, wherein the computer program is arranged to cause the controller to cause the at least one encoder to encode and frequency shift. Thus the controller may be configured by virtue of being arranged to execute the computer program, once the apparatus comprising the at least one encoder and the controller is switched on. The computer program may be stored in a memory the controller can access, such as, for example, a read only memory or a system memory.

Figure 1B:
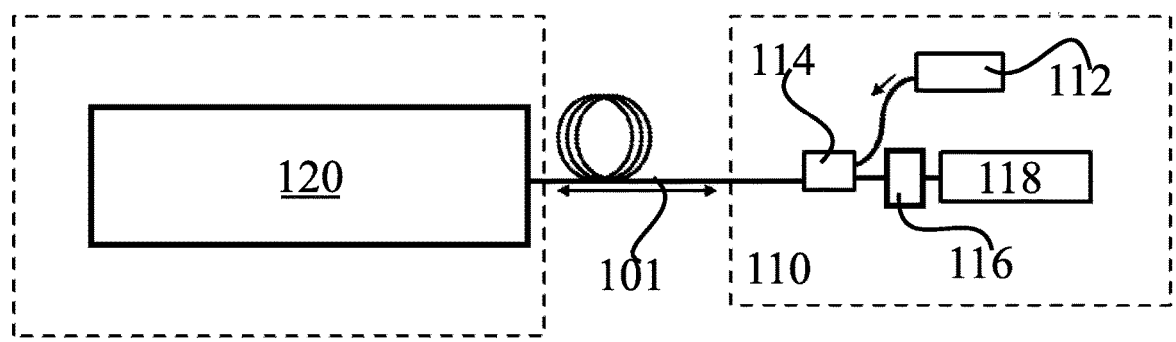
FIG. 1B illustrates a system in accordance with at least some embodiments of the present invention.

FIG. 1B illustrates a system in accordance with at least some embodiments of the present invention. The system of FIG. 1B may be seen as an embodiment of the system of FIG. 1A, presented in more detail than FIG. 1A. Receiver 110, emitter 120 and fibre 101 correspond to like elements in FIG. 1A.

Receiver 110 comprises light source 112, which may comprise, as described above, a laser, such as a continuous-wave or modulated laser, for example. Light from light source 112 is directed toward fibre 101 via device 114, which may comprise, for example, a coupler or a circulator. Light arriving in receiver 110 may be measured in detector 118, after filtering in filter 116. Filter 116 may comprise a spectrally discriminating filter, for example. An example of a spectrally discriminating filter is a bandpass filter such that a resulting pass band corresponds to a frequency into which the encoded light is shifted to in encoder 120. This bandpass filter could be a combination of a longpass filter and a shortpass filter. Another example of a spectrally discriminating filter is a notch filter, wherein the notch frequency may be set at the frequency at which light is provided from light source 112. An example of an optical notch filter is a guided-mode resonance filter.

Figure 2:
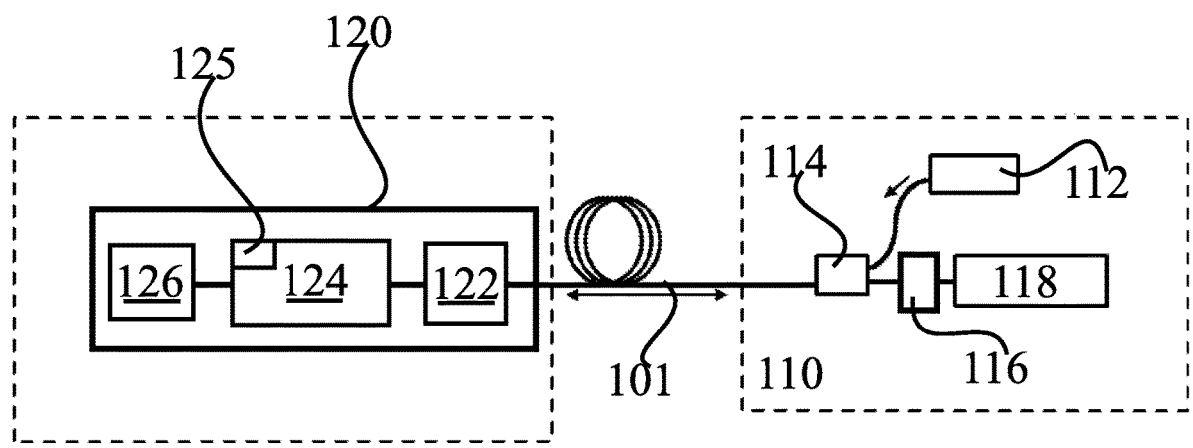
FIG. 2 illustrates a system in accordance with at least some embodiments of the present invention.

FIG. 2 illustrates a system in accordance with at least some embodiments of the present invention. The system of FIG. 2 is presented in more detail in the emitter side, when compared to the system of FIG. 1B. Like numbering denotes like structure as in FIG. 1B. In FIG. 2, emitter 120 comprises an optical attenuator 122, a phase shifter 124 and a Faraday mirror 126. Phase shifter 124 may be configured to encode light received in emitter 120 from receiver 110 with the payload information, and to impart the frequency shift on the light, to thereby cause its frequency to change. Faraday minor 126 is arranged to reflect the light back toward fibre 101, so that the encoded and frequency shifted light may be conveyed back to receiver 110 via fibre 101. Alternatively to a minor arrangement, emitter 120 may comprise a waveguide or optical fibre arrangement configured to convey light back toward fibre 101. Phase shifter 124 may comprise one or more than one phase shifter. A controller 125 may be coupled with phase shifter 124, the controller being arranged to cause phase shifter 124 to encode the light and to frequency shift the light, as described above. Controller 125 may be comprised in phase shifter 124, or more generally an encoder, or it may be otherwise coupled with phase shifter 124, or at least one encoder.

Figure 3:
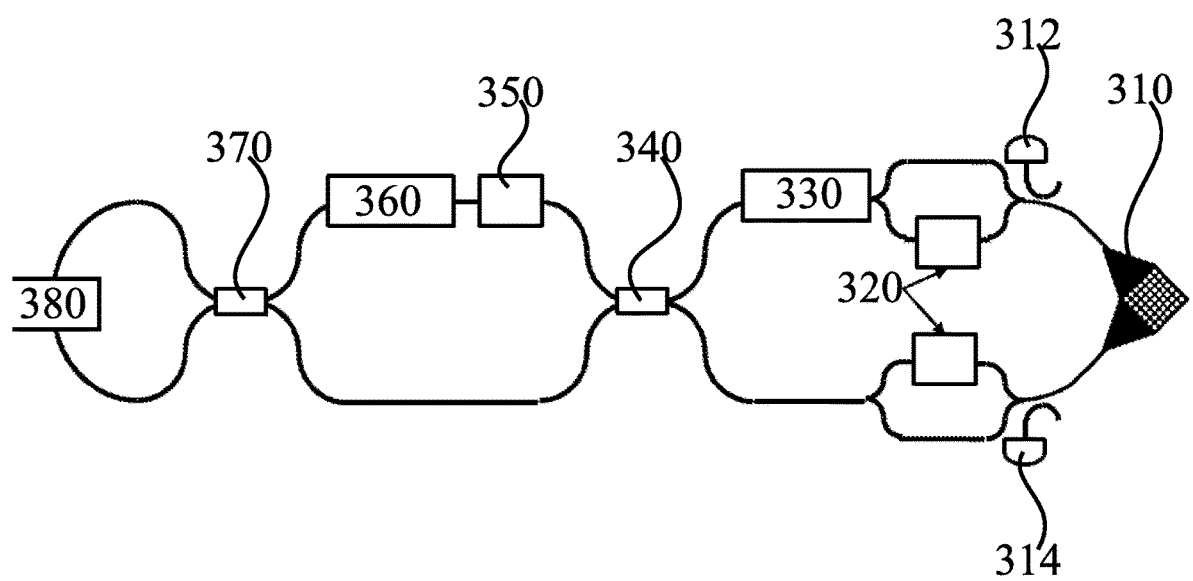
FIG. 3 illustrates a silicon implementation of at least some embodiments of the present invention.

FIG. 3 illustrates a silicon implementation of at least some embodiments of the present invention. The implementation, which may comprise an example of a silicon photonics implementation of at least part of the emitter, comprises polarization splitting fibre coupler 310, which is configured to convert light arriving in the emitter to dual rail form. Detector Z+, 312, and detector Z−, 314, may be employed to help control polarization rotation compensation, for example. Phase shifters 330, 350 and 360 may configurably cause the dual rail form light to be encoded with the information that is to be transmitted to the receiver, and/or to compensate at least in part for polarization rotation incurred in fibre 101. In the illustrated implementation, a loop on the left is used to convey light back toward its origin. Amplitude and phase modulator 380 may be operable to pulse and frequency shift the light before its conveyance back to fibre 101. In embodiments where amplitude and phase modulator 380 is not arranged to impart the frequency shift to the light, at least one of phase shifters 330, 350 and 260 may further be configured to impart the frequency shift to the light. 2×2 MMI couplers 340 and 370 convey the dual rail form light in the implementation. MZI attenuators 320 may configurably be used to select a light power to emit back into the fibre. In general, in various embodiments of the invention a pulsed mode may be employed. Pulse modulation may be performed in one of several possible stages before the return trip of the light in the fibre, for example, the light source itself may be modulated, an output of the light source may be modulated, for example using MZI, or pulse modulation may be performed in the encoder, such as in amplitude and phase modulator 380, as long as both rails are modulated. Modulation may also be performed in an attenuation stage.

Figure 4:
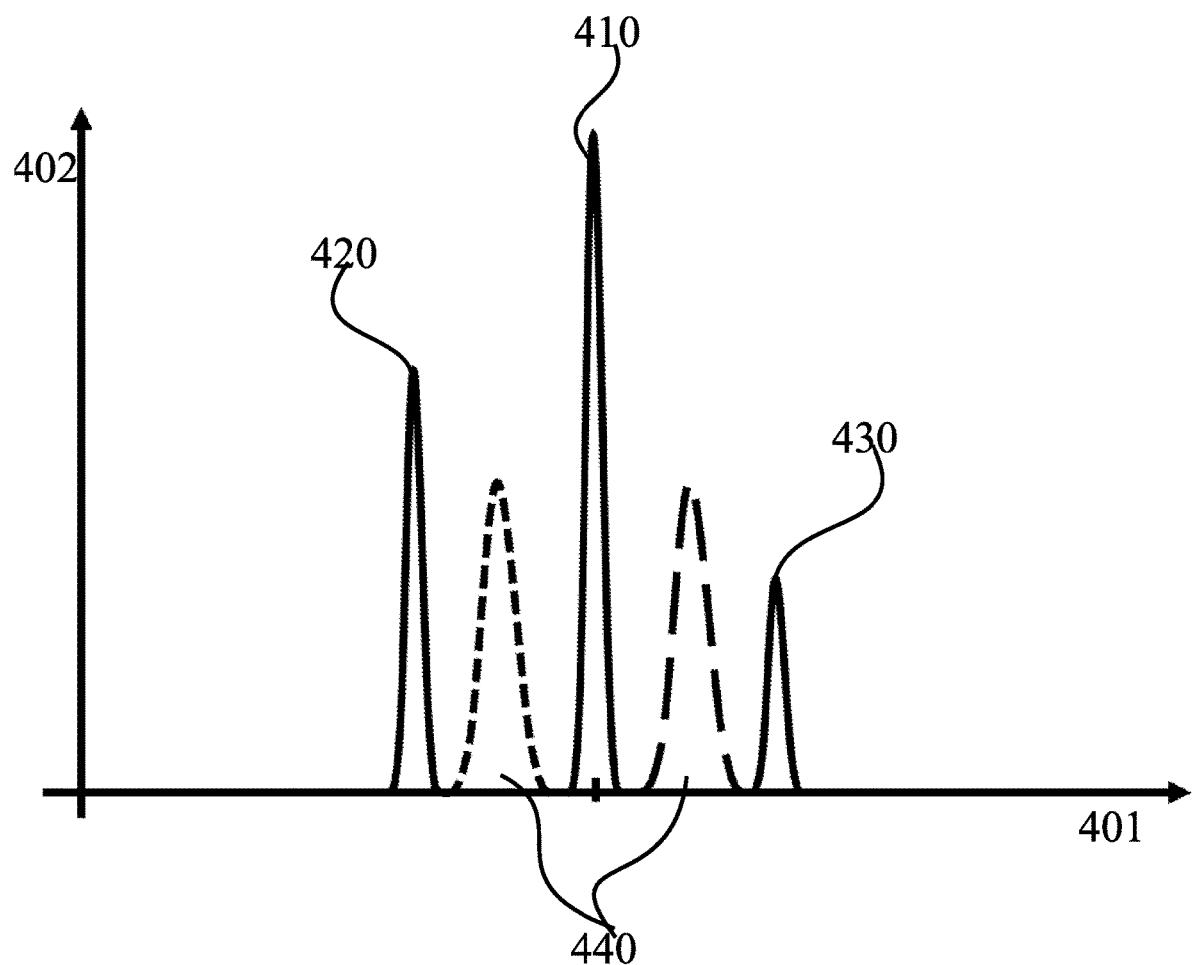
FIG. 4 illustrates frequencies to facilitate understanding at least some embodiments of the invention.

FIG. 4 illustrates frequencies to facilitate understanding at least some embodiments of the invention. The illustrated power spectrum is that of light received in receiver 110. On the horizontal axis is frequency, 401, which increases from left toward the right. On the vertical axis is power, 402, which increases from the bottom toward the top. Peak 410 corresponds to Rayleigh scattering and back-reflections that occur in fibre 101 as a reaction to light provided from receiver 110 into fibre 101. The frequency of peak 410 may correspond to a frequency of light that is provided to fibre 101 from receiver 110.

Peak 420 corresponds to Stokes Brillouin scattering of light in fibre 101. Brillouin scattering may occur where light interacts with periodic variations in refractive index, which may occur in the core of fibre 101. In the Stokes variant of Brillouin scattering, a scattering photon loses energy and consequently shifts lower in frequency. The photon may interact with a quasiparticle, such as a phonon or a polaron, in an interaction which loses photon energy. Peak 430 corresponds to anti-Stokes Brillouin scattering, wherein a photon interacts with a quasiparticle to gain energy, shifting to a higher frequency as a result.

Peaks 440 correspond to encoded light shifted in frequency, to higher and lower frequency with respect the light incoming into emitter 120 from receiver 110. As can be seen from the figure, a correctly selected frequency shift is large enough to shift the encoded light away from the wavelength of non-encoded peak 410, and simultaneously the frequency shift avoids placing an encoded light peak 440 onto a Brillouin scattering frequency. In practice, in terms of laser light, 1 GHz is in many embodiments sufficient to avoid peak 410 where pulse length is, for example, 1 ns, and the Brillouin peaks are disposed at approximately 10 GHz on either side of peak 410. Therefore, a frequency shift of 1-10 GHz to higher, lower or alternatingly higher and lower frequency can be a useful choice. A 1 GHz frequency shift may correspond to a $2\pi$ additional phase per nanosecond, for example. In various embodiments, the frequency shift of peak or peaks 440 is to higher frequency, to lower frequency or alternatingly higher and lower frequency. Where only one frequency shift is used, for example to a higher frequency, there will be only one peak 440 corresponding to this frequency shift.

A distance in frequency between peak 410 and a peak 440 corresponds to a magnitude of a frequency shift. A width of peak 440, on the other hand, corresponds to a modulation bandwidth. When encoding light with information, modulation symbols impart frequency components to the light, which has the effect of broadening the spectral character of the light. An extent of broadening depends on the modulation scheme that is used.

Figure 5:
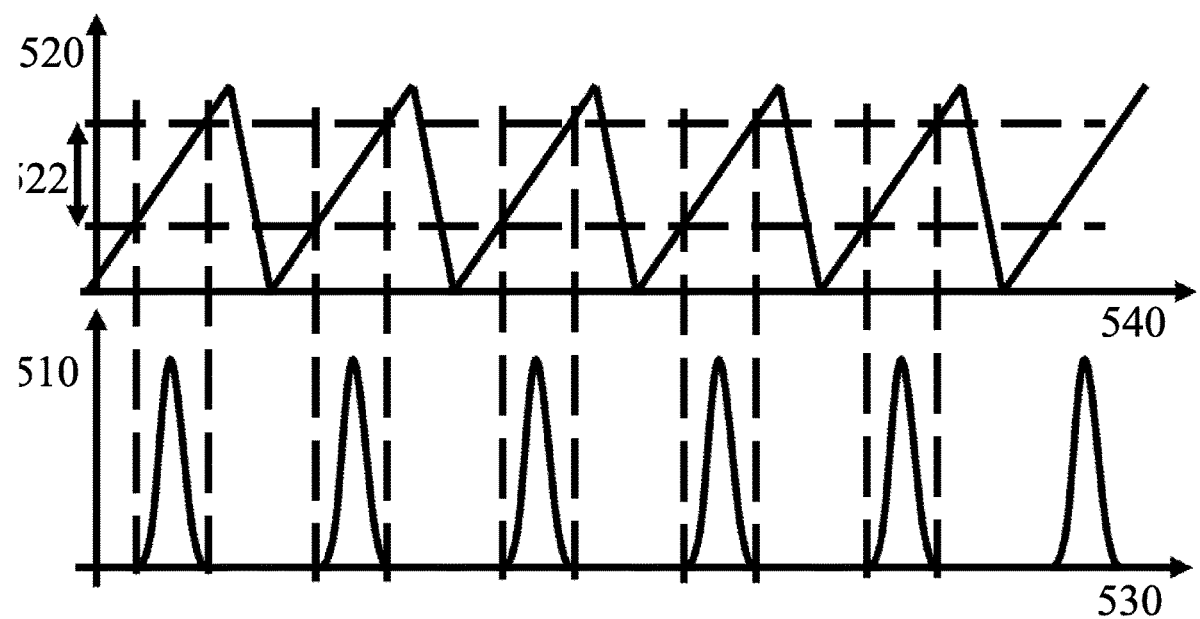
FIG. 5 illustrates power and phase shift in relation to time in accordance with at least some embodiments of the present invention.

FIG. 5 illustrates power and phase shift in relation to time in accordance with at least some embodiments of the present invention. Two horizontal time axes 530 and 540 advance from the left toward the right. In the upper chart, the vertical axis 520 denotes phase shift. In the lower chart, the vertical axis 510 denotes power.

A phase shift 522 exceeds a $2\pi$ shift in phase. As can be seen on the figure, such a shift is applied over each pulse separately, effecting a frequency shift to each of the pulses. A saw-tooth shaped electrical signal may be applied to a phase shifter to effect the shift in phase, and consequently the frequency shift, to the pulses that are encoded or that are to be encoded in encoder 120. While no pulse is ongoing, the phase shifter can be shifted back to a position from where it can impart phase shift 522 to the following pulse.

Figure 6:
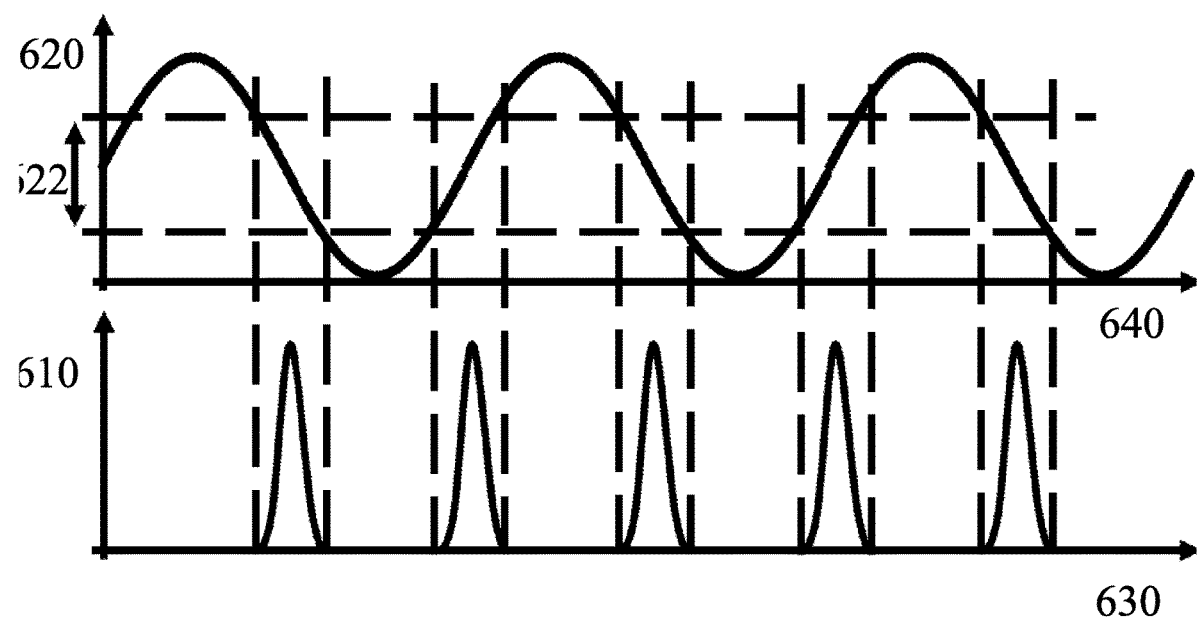
FIG. 6 illustrates power and phase shift in relation to time in accordance with at least some embodiments of the present invention.

FIG. 6 illustrates power and phase shift in relation to time in accordance with at least some embodiments of the present invention. Two horizontal time axes 630 and 640 advance from the left toward the right. In the upper chart, the vertical axis 620 denotes phase shift. In the lower chart, the vertical axis 610 denotes power.

A phase shift 622 exceeds a $2\pi$ shift in phase. As can be seen on the figure, such a shift is applied over each pulse separately, effecting a frequency shift to the pulses. A sinusoidal shaped electrical signal may be applied to a phase shifter to effect the shift in phase, and consequently the frequency shift, to pulses that are encoded or that are to be encoded in encoder 120. While no pulse is ongoing, the phase shifter can be shifted back, using the sinusoidal electrical signal, to a position from where it can impart phase shift 622 to the following pulse. An advantage of a sinusoidal electrical signal over the saw-tooth shaped electrical signal of FIG. 5 is that it is easier to produce, while a drawback is that the phase shift is not entirely linear. However, in various embodiments the phase shift produced by a sinusoidal signal is sufficiently linear. The saw-tooth shaped electrical signal, on the other hand, yields a linear phase shift, but producing the saw-tooth shaped electrical signal requires a wider electrical bandwidth to accommodate its high-frequency aspects.

Figure 7:
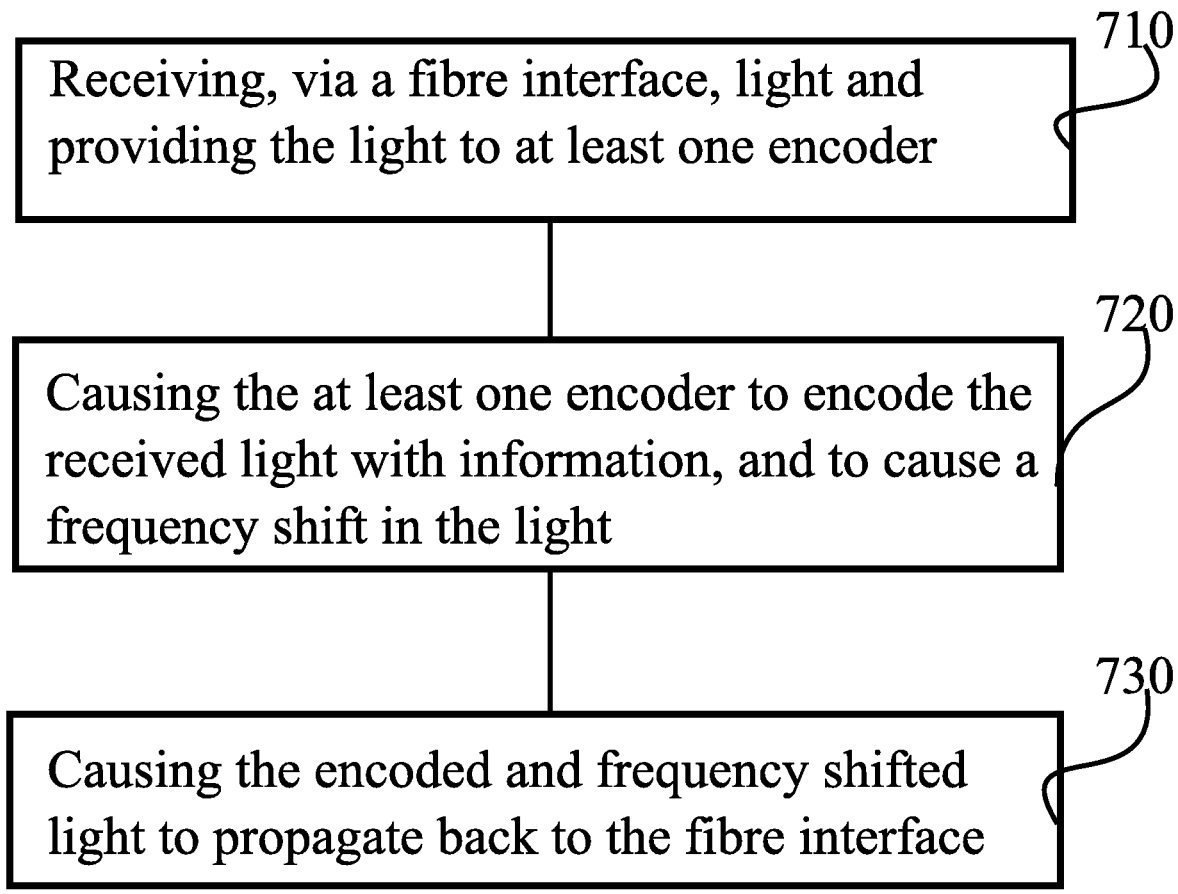
FIG. 7 is a flow graph of a first method in accordance with at least some embodiments of the present invention.

FIG. 7 is a flow graph of a first method in accordance with at least some embodiments of the present invention. The phases of the illustrated method may be performed in emitter 120, for example.

Phase 710 comprises receiving, via a fibre interface, light and providing the light to at least one encoder. Phase 720 comprises causing the at least one encoder to encode the received light with information, and to cause a frequency shift in the light. Finally, phase 730 comprises causing the encoded and frequency shifted light to propagate back to the fibre interface.

Figure 8:
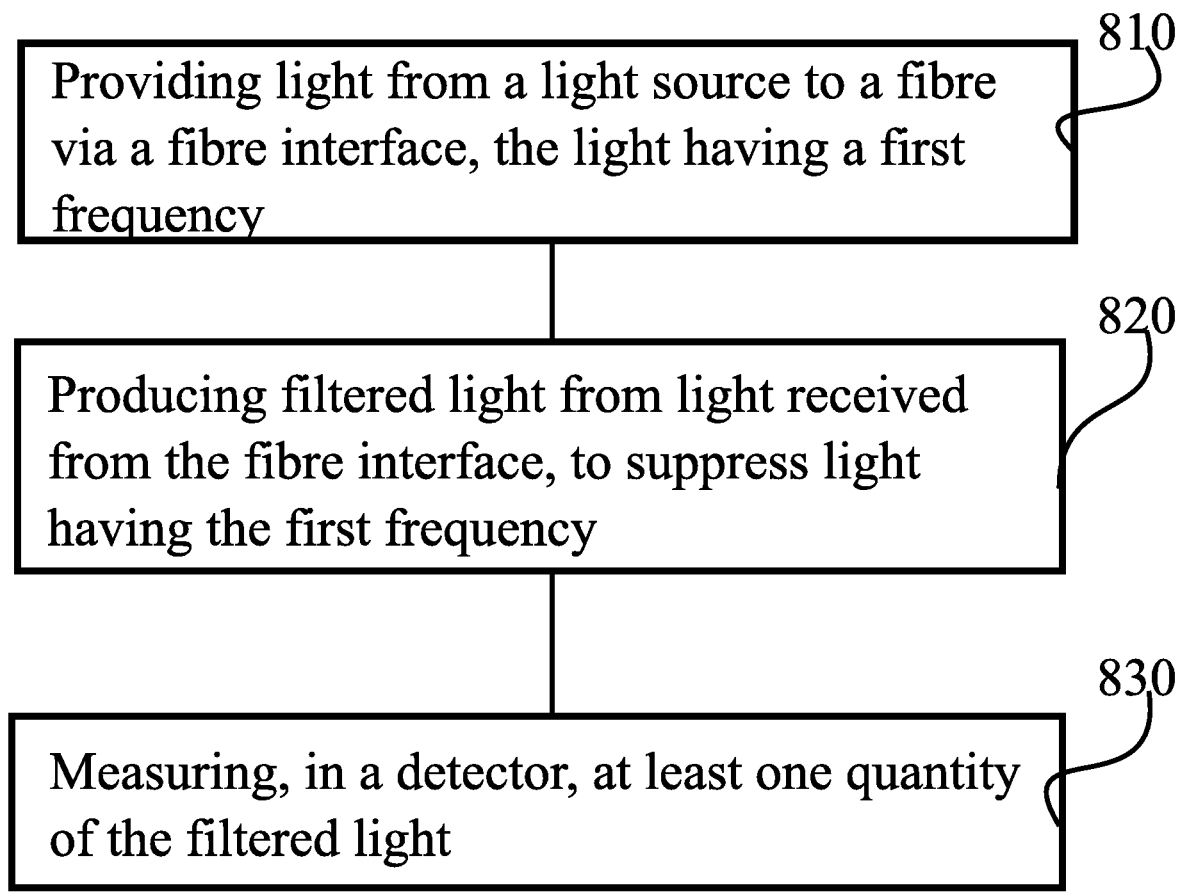
FIG. 8 is a flow graph of a second method in accordance with at least some embodiments of the present invention.

FIG. 8 is a flow graph of a second method in accordance with at least some embodiments of the present invention. The phases of the illustrated method may be performed in receiver 110, for example.

Phase 810 comprises providing light from a light source to a fibre via a fibre interface, the light having a first frequency. Phase 820 comprises producing filtered light from light received from the fibre interface, to suppress light having the first frequency. Finally, phase 830 comprises measuring, in a detector, at least one quantity of the filtered light. The detector may comprise a dual rail detector, a polarization state detector or at least one single photon detector, for example.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in optical communication.

ACRONYMS LIST

ASIC Application specific integrated circuit
ns nanosecond

MMI multi-mode interferometer
MZI Mach-Zehnder Interferometer
SM Single mode

The invention claimed is:

1. An apparatus comprising:
a fibre interface coupled to a light source, the light source being configured to provide light to a fibre via the fibre interface, the light having a first frequency;
a frequency selective optical filter optically coupled to the fibre interface, arranged, in producing filtered light, to suppress light having the first frequency, wherein the optical filter is arranged to admit light which deviates from the first frequency by a frequency offset having an absolute value of at least 1 gigahertz and at most 10 gigahertz, and
a detector optically coupled to the optical filter, arranged to measure at least one quantity of the filtered light.

2. The apparatus according to claim 1, wherein the optical filter is further arranged, in producing the filtered light, to suppress light at a frequency of Brillouin scattering of light at the first frequency.

3. The apparatus according to claim 1, wherein a coupler or circulator couples the light source to the fibre interface, and the fibre interface to the optical filter.

4. The apparatus according to claim 1, wherein the detector comprises a dual rail detector.

5. The apparatus according to claim 1, wherein the light source comprises a laser.

6. A method, comprising:
providing light from a light source to a fibre via a fibre interface, the light having a first frequency;
producing filtered light from light received from the fiber interface by suppressing light having the first frequency by admitting light which deviates from the first frequency by a frequency offset having an absolute value of at least 1 gigahertz and at most 10 gigahertz, and
measuring, in a detector, at least one quantity of the filtered light.

* * * * *